(12) United States Patent
Asano

(10) Patent No.: US 10,009,548 B2
(45) Date of Patent: Jun. 26, 2018

(54) LENS APPARATUS, IMAGE PICKUP APPARATUS, AND IMAGE PICKUP SYSTEM

(71) Applicant: CANON KABUSHIKI KAISHA, Tokyo (JP)

(72) Inventor: Kota Asano, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 190 days.

(21) Appl. No.: 14/810,747

(22) Filed: Jul. 28, 2015

(65) Prior Publication Data

US 2016/0037040 A1     Feb. 4, 2016

(30) Foreign Application Priority Data

Jul. 29, 2014   (JP) ................... 2014-153831

(51) Int. Cl.
H04N 5/238      (2006.01)
H04N 5/232      (2006.01)
(Continued)

(52) U.S. Cl.
CPC .............. *H04N 5/238* (2013.01); *G03B 9/06* (2013.01); *G03B 17/14* (2013.01); *H04N 5/2351* (2013.01);
(Continued)

(58) Field of Classification Search
CPC .............. H04N 5/238; H04N 5/23209; H04N 5/23212; H04N 5/2351; G03B 9/06; G03B 17/14
(Continued)

(56) References Cited

U.S. PATENT DOCUMENTS

2005/0110897 A1 * 5/2005 Wakabayashi ....... H04N 5/2353
                                                           348/362
2006/0066747 A1 * 3/2006 Tsuda ..................... G03B 7/095
                                                           348/360
(Continued)

FOREIGN PATENT DOCUMENTS

CN       101510043 A      8/2009
JP        10260449 A      9/1998
(Continued)

OTHER PUBLICATIONS

Office Action issued in Chinese Appln. No. 201510441628.X dated Nov. 17, 2017. English translation provided.

*Primary Examiner* — Sinh Tran
*Assistant Examiner* — Zhenzhen Wu
(74) *Attorney, Agent, or Firm* — Rossi, Kimms & McDowell LLP

(57) ABSTRACT

A lens apparatus attached to and detached from an image pickup apparatus includes a diaphragm unit, a driver configured to drive the diaphragm unit, and a lens controller configured to communicate with the image pickup apparatus to which the lens apparatus is attached, and to control the driver based on aperture driving instruction information or aperture stop time request received from the image pickup apparatus. The lens controller is configured to send to the image pickup apparatus time information necessary to drive the diaphragm unit according to the aperture driving instruction information or aperture stop time request, during a period that starts when the driver starts driving the diaphragm unit and ends when the driver stops driving the diaphragm unit.

15 Claims, 5 Drawing Sheets

(51) Int. Cl.
*H04N 5/235* (2006.01)
*G03B 9/06* (2006.01)
*G03B 17/14* (2006.01)

(52) U.S. Cl.
CPC ..... *H04N 5/23209* (2013.01); *H04N 5/23212* (2013.01)

(58) Field of Classification Search
USPC .................................................. 348/362–367
See application file for complete search history.

(56) References Cited

U.S. PATENT DOCUMENTS

| | | | |
|---|---|---|---|
| 2006/0221223 A1* | 10/2006 | Terada | H04N 5/2351 348/333.05 |
| 2009/0279882 A1* | 11/2009 | Shida | G03B 9/00 396/260 |
| 2010/0066890 A1* | 3/2010 | Ueda | G02B 7/102 348/333.02 |
| 2010/0214439 A1* | 8/2010 | Oshima | G03B 7/08 348/229.1 |
| 2013/0222669 A1 | 8/2013 | Irie | |

FOREIGN PATENT DOCUMENTS

| | | |
|---|---|---|
| JP | 2006208897 A | 8/2006 |
| JP | 2006215399 A | 8/2006 |
| JP | 4933049 B2 | 5/2012 |
| JP | 2014063188 A | 4/2014 |

\* cited by examiner

LENS APPARATUS, IMAGE PICKUP APPARATUS, AND IMAGE PICKUP SYSTEM

BACKGROUND OF THE INVENTION

Field of the Invention

The present invention relates to a lens apparatus having a diaphragm unit configured to adjust the light quantity, an image pickup apparatus, to/from which the lens apparatus is attached/detached, and an image pickup system including the lens apparatus and the image pickup apparatus.

Description of the Related Art

In Japanese Patent No. 4,933,049, an interchangeable lens sends, to a camera body, information of an end of an operation of a diaphragm unit in the interchangeable lens, without waiting for a light-quantity stabilization period after the diaphragm unit is stopped, when the shutter speed in the camera body is lower than a predetermined value. After receiving this information from the interchangeable lens, the camera body starts exposure.

However, the prior art disclosed in Japanese Patent No. 4,933,049 cannot handle a case where the shutter speed in the camera body is high in comparison with the light-quantity stabilization period. In addition, the prior art can handle only driving in the aperture narrowing direction, and thus the continuous capturing speed is limited.

SUMMARY OF THE INVENTION

The present invention provides a lens apparatus, an image pickup apparatus, and an image pickup system, each of which is advantageous to an acceleration of the continuous capturing speed.

A lens apparatus according to the present invention attached to and detached from an image pickup apparatus includes a diaphragm unit, a driver configured to drive the diaphragm unit, and a lens controller configured to communicate with the image pickup apparatus to which the lens apparatus is attached, and to control the driver based on aperture driving instruction information or aperture stop time request received from the image pickup apparatus. The lens controller is configured to send to the image pickup apparatus time information necessary to drive the diaphragm unit according to the aperture driving instruction information or aperture stop time request, during a period that starts when the driver starts driving the diaphragm unit and ends when the driver stops driving the diaphragm unit.

Further features of the present invention will become apparent from the following description of exemplary embodiments with reference to the attached drawings.

DESCRIPTION OF THE EMBODIMENTS

Referring now to the accompanying drawings, a description will be given of an embodiment according to the present invention.

Referring now to FIGS. 1 to 5, a description will be given of a lens apparatus, an image pickup apparatus, and an image pickup system, each of which is suitable for a higher continuous capturing speed according to one embodiment of the present invention.

Figure 2:
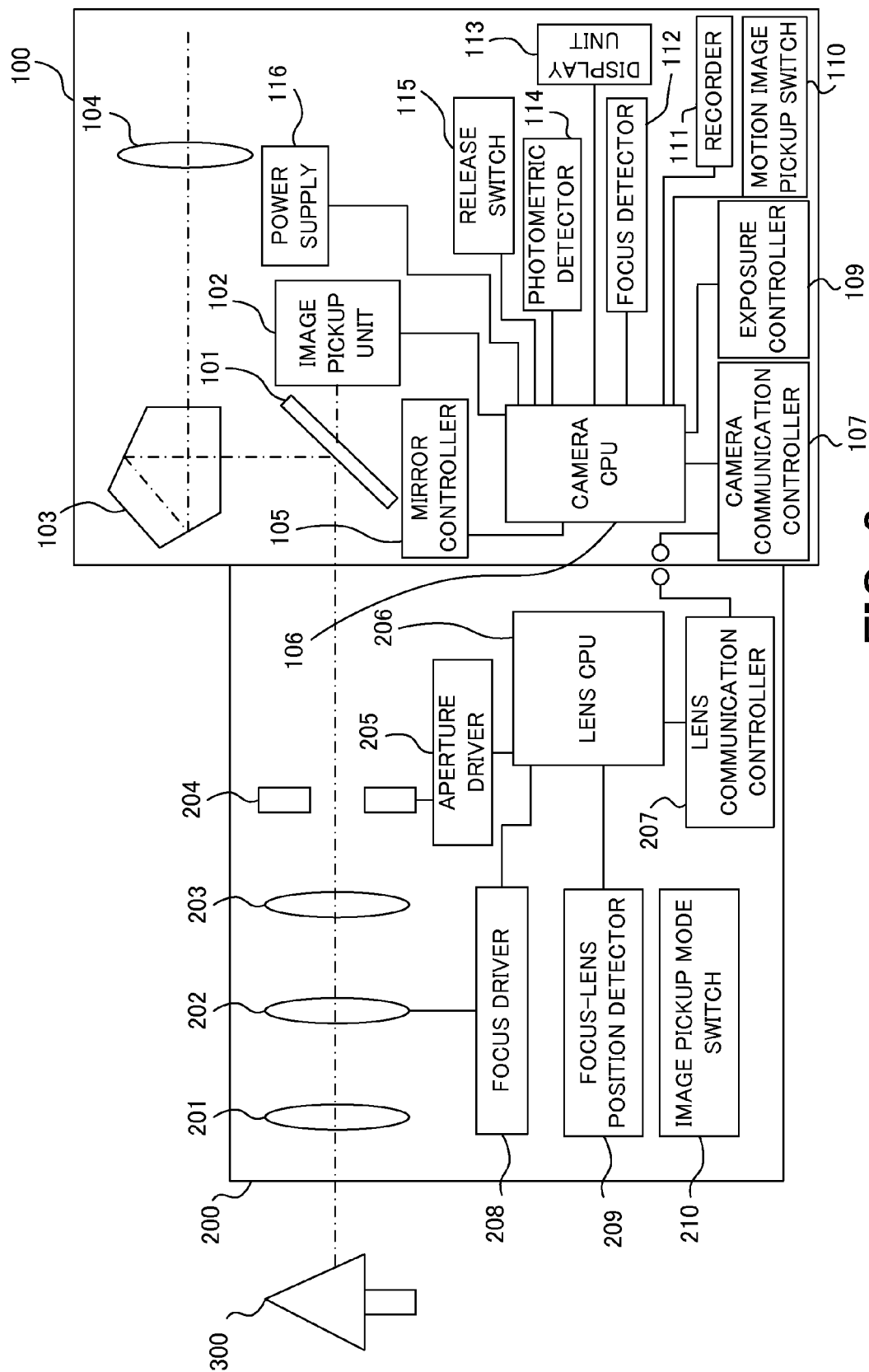
FIG. 2 is a block diagram of a camera system according to the embodiment of the present invention.

FIG. 2 is a block diagram illustrating a structure of a lens interchangeable type single-lens reflex camera as a camera system according to one embodiment of the present invention. In FIG. 2, reference numeral 100 denotes a camera body as an image pickup apparatus according to the present invention. Reference numeral 200 denotes an interchangeable lens as a lens apparatus according to the present invention, which is attached to and detached from the camera body 100. The camera body 100 can detachably hold the interchangeable lens 200. The camera body 100 and the interchangeable lens 200 form the camera system as an image pickup system according to the present invention. The camera system according to the present invention has an accelerated autofocus driving function and an accelerated aperture driving function for quick continuous capturing, and such a camera system is demanded to further improve the speed because the continuous capturing speed is one index of the camera performance.

In the interchangeable lens 200, reference numeral 201 denotes a first lens unit, reference numeral 202 denotes a focus lens unit, a reference numeral 203 denotes a variable-magnification lens unit, and reference numeral 204 denotes a diaphragm unit according to the present invention. An image pickup optical system includes these lens units 201 to 203 and the diaphragm unit 204. The diaphragm unit 204 includes a plurality of unillustrated aperture blades, an unillustrated opener/closer configured to open and close the plurality of aperture blades, and an aperture driver 205 configured to drive the plurality of aperture blades by driving the opener/closer. The diaphragm unit 204 includes an unillustrated component having an aperture diameter, which will be described later, as a fixed aperture diameter, separate from the plurality of unillustrated aperture blades. The diaphragm unit 204 is the so-called iris diaphragm configured to form an aperture on an optical axis as a result of that the plurality of aperture blades partially overlap each other. An aperture value varies according to the positions of the plurality of aperture blades. In addition, an overlap amount among the plurality of aperture blades varies and an operational load applied to the aperture driver 205 varies according to the positions of the plurality of aperture blades. In general, the operational load is larger on the side in which the aperture value is larger or the overlap amount among the plurality of aperture blades is larger. The aperture driver 205 includes a stepping motor in this embodiment, and its driving is controlled by a lens CPU 206 as a diaphragm control unit according to this embodiment, which will be described later. The diaphragm unit 204 includes an unillustrated aperture position detector configured to detect the positions of the plurality of aperture blades corresponding to the aperture value. While this embodiment provides the aperture position detector so as to handle an impact and another unexpected event, open-loop control utilizing a pulse count of the stepping motor may be performed. Reference numeral 209 denotes a focus-lens position detector configured to detect the position of the focus lens unit 202. The lens CPU 206 communicates various information with a camera CPU 106, which will be described later, via the lens communication controller 207 and the camera communication controller 107, and controls the entire operation of the interchangeable lens 200 in cooperation with the camera CPU 106. The lens CPU 206 and the lens communication controller 207 may constitute the lens controller according to the present invention. The lens controller according to the present invention communicates with the camera body 100 to which the interchangeable lens 200 is attached, and controls the aperture driver 205 based on aperture driving instruction information, which will be described later, received from the camera body 100. The focus driver 208 includes a stepping motor, a vibrating motor, etc., and moves the focus lens unit 202 in the optical-axis direction via the unillustrated focus driving mechanism. The lens controller serves as a focus control unit configured to control driving of the focus driver 208 (in rotating direction and driving instruction value). More specifically, the driving direction of the focus driver 208 is controlled by changing the polarity in the focus driving instruction information which is applied to the focus driver 208, and driving of the focus driver 208 is controlled by adjusting the number of pulses in the focus driving instruction information. Thereby, the moving amount of the focus lens unit 202 in the optical-axis direction is controlled. At this time, the lens CPU 206 refers to focus position information from a focus-lens position detector 209. The lens CPU 206 also controls driving of the aperture driver 205 (in rotating direction and driving instruction value). More specifically, the driving direction of the aperture driver 205 is controlled by changing the polarity in the aperture driving instruction information applied to the aperture driver 205, and driving of the aperture driver 205 is controlled by adjusting the number of pulses in the aperture driving instruction information. Thereby, the opening/closing amount among the plurality of aperture blades is controlled in the diaphragm unit 204. At this time, the lens CPU 206 refers to aperture position information from the unillustrated aperture position detector. Reference numeral 210 denotes an image pickup mode switch unit operated by a user (photographer) so as to switch a still-image pickup mode and motion-image pickup mode. While this embodiment provides the interchangeable lens 200 with the image pickup mode switch 210, the camera body 100 may include the image pickup mode switch unit 210. Object light from an object 300 passes the image pickup optical system in the interchangeable lens 200 and then enters the camera body 100.

In the camera body 100, while the mirror 101 as a light-guiding unit according to this embodiment is retreated from the optical path, an object image is formed on an image pickup unit 102 by the light from the object 300. The image pickup unit 102 includes a photoelectric conversion element, such as a CCD image sensor and a CMOS image sensor, and photoelectrically converts the object image. When the mirror 101 is arranged on the optical path, the object light is reflected on the mirror 101 and guided to a pentaprism 103. The object light reflected on the pentaprism 103 passes a viewfinder optical system 104, and is led to the user's (photographer's) eye. Thus, the user can visually confirm the object image. In other words, the mirror 101 is retreated from the optical path so as to guide the light from the object to the image pickup unit 102, and inserted into the optical path so as to guide the light from the object to the photographer's eye. Reference numeral 105 denotes a mirror controller configured to control moving up and down the mirror 101 in accordance with the driving instruction information from the camera CPU 106. Reference numeral 114 denotes a photometric detector configured to calculate object brightness based on an output signal of the image pickup unit 102 or an image signal generated by an unillustrated image processor, which will be described later, and outputs photometric information to the camera CPU 106. Reference numeral 112 denotes a focus detector configured to detect a focus state of the image pickup optical system using a phase difference detection method based on the object light reflected on an unillustrated sub-mirror provided behind the mirror 101 in the still image pickup mode. The focus information representing the focus state is output to the camera CPU 106. The camera CPU 106 controls the position of the focus lens unit 202 via the focus driver 208 based on the focus information, and realizes the in-focus state. The camera CPU 106 generates contrast information representing a contrast state of the image based on an image signal generated by the unillustrated image processor in the motion image pickup mode, and realizes the in-focus state by controlling the position of the focus lens unit 202 based on the contrast information. The exposure controller 109 mounted on the camera body 100 calculates, based on the photometric information, an aperture value to be set to the diaphragm unit 204 and a shutter speed used to control the exposure amount of the image pickup unit 102 in the still image pickup mode. The camera CPU 106 and the camera communication controller 107 may constitute a camera controller according to this embodiment. The camera controller according to this embodiment communicates with the interchangeable lens 200 attached to the camera body 100, and sends aperture driving instruction information, which will be described later, to the interchangeable lens 200. In addition, the camera controller of this embodiment starts an operation of the camera body 100 (such as a photometric operation, a focus detecting operation, and an exposure operation) based on time information necessary to drive the diaphragm unit, which will be described later, which is received from the interchangeable lens 200. Reference numeral 115 denotes a release switch unit configured to output a SW1 signal when the user half-presses the release switch unit 115 (or turns on the SW1), and to output a SW2 signal when the user fully presses the release switch unit 115 (or turns on the SW2). The camera CPU 106 starts a still image pickup preliminary operation containing a photometric operation and a focus detecting operation in accordance with an input of the SW1 signal, and starts an image pickup operation (exposure operation) for recording a still image in accordance with an input of the SW2 signal. Reference numeral 110 denotes a motion image pickup switch unit configured to alternately output a motion image pickup start signal and a motion image pickup stop signal for each user's operation. The camera CPU 106 starts a capturing operation (exposure operation) for recording a motion image in accordance with an input of the motion image pickup start signal and stops the image pickup operation in accordance with an input of the motion image pickup stop signal. While this embodiment provides the motion image pickup switch unit 110 separately from the release switch unit 115, the release switch unit 115 may serve as the motion image pickup switch unit. A digital image signal is generated when the unillustrated image processor amplifies and applies various image processing to the image signal output from the image pickup unit 102. The camera CPU 106 generates a still image for recording use, a motion image for display use, and a motion image for recording use by using the digital image signal. The motion image for display use is displayed as an electronic viewfinder image on the display unit 113 that includes a display element, such as an LCD panel. The still image for recording use and the motion image for recording use are recorded on the recording medium, such as a semiconductor memory, by the recorder 111. Reference numeral 116 denotes a power source.

A description will now be given of a method for accelerating continuous capturing speed by accelerating the narrowing and opening the aperture in the diaphragm unit in the lens apparatus and the camera system according to the present invention.

Figure 5:
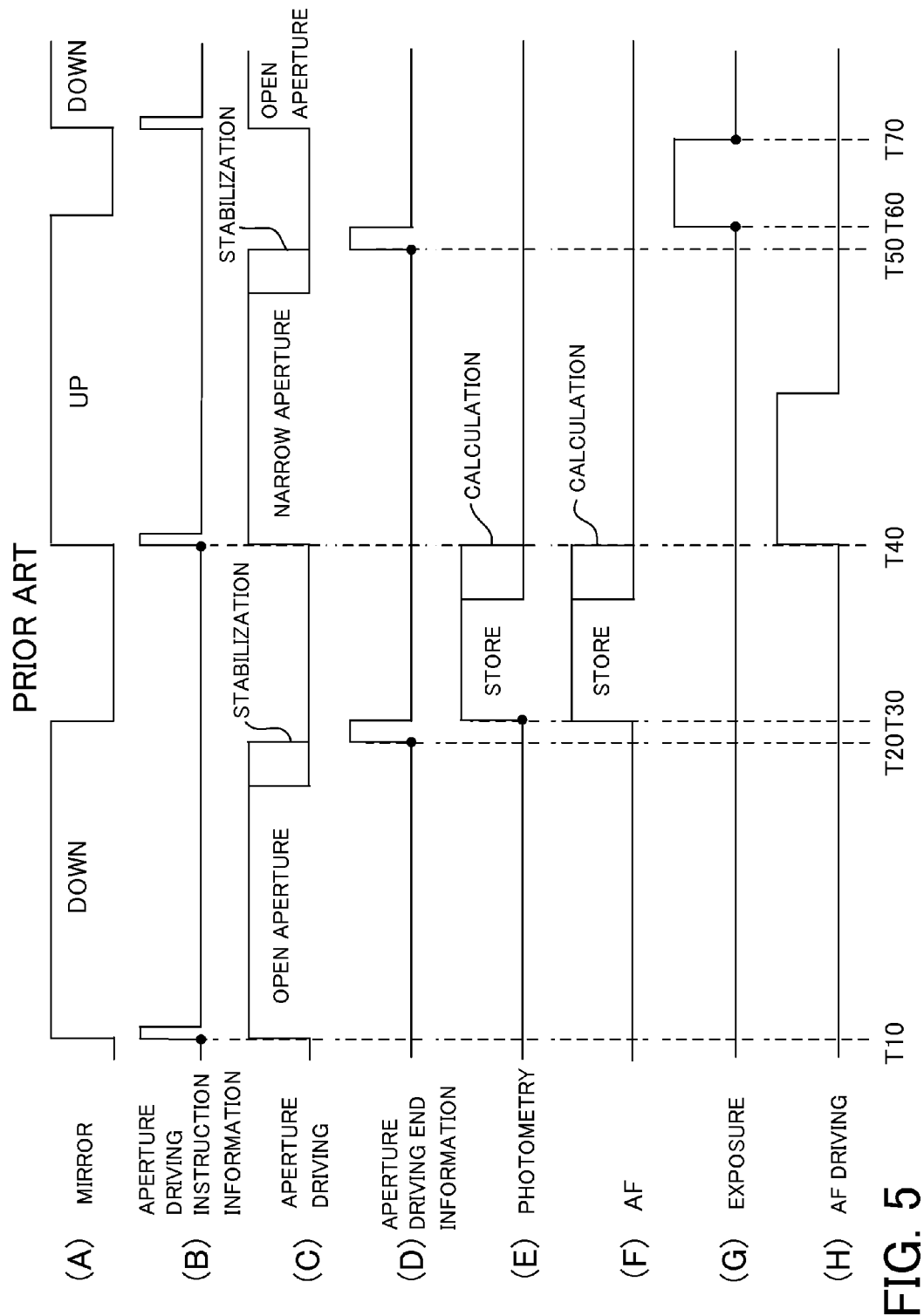
FIG. 5 is a timing chart of a conventional camera system.

FIG. 5 is a timing chart of the conventional camera system. Each of (A) to (H) denotes an operation of the lens apparatus or the camera body, and each of T10 to T70 represents characteristic time in the time base on each operation.

At the time T10, the camera body (A) moves down the mirror and (B) sends aperture driving instruction information to the lens apparatus. When the lens apparatus receives the aperture driving instruction information (aperture opening instruction information) used to open the aperture of the diaphragm unit from the camera body, (C) the diaphragm unit starts opening the aperture.

The lens apparatus (C) opens the aperture of the diaphragm unit based on the aperture driving instruction information from the camera body, and sends driving end information of the diaphragm unit (D) at the time T20 to the camera body after each component in the diaphragm unit becomes stable (after the stabilization period).

The camera body receives (D) the driving end information of the diaphragm unit from the lens apparatus, and detects the light quantity of or around the object so as to start (E) photometric storage and calculating operation (photometric operation) used to calculate a proper shutter speed and an aperture amount at the time T30. At the same time, the camera body starts (E) the AF storage and calculating operation (focus detecting operation) used to detect the focus state of the object.

As soon as the (E) photometric storage and calculating operation and (F) AF storage and calculating operation end, the camera body (A) moves up the mirror and (B) sends the aperture driving instruction information to the lens apparatus at the time T40. In parallel, the camera body sends to the lens apparatus an AF driving signal so as to focus on the object, and the lens apparatus performs ((H) AF driving). When the lens apparatus receives the aperture driving instruction information from the camera body, which is herein the aperture narrowing instruction information used to narrow the aperture, the diaphragm unit (C) starts narrowing the aperture.

The lens apparatus narrows the aperture of the diaphragm unit (C) based on the aperture driving instruction information from the camera body, and sends at the time T50 the driving end information of the diaphragm unit (D) to the camera body after each component in the diaphragm unit becomes stable.

The camera body receives driving end information of the diaphragm unit (D) from the lens apparatus, starts (G) the exposure operation at the time T60, and ends the exposure operation at the time T70.

A total time period from the time T10 to the time T70 of the series of operations determines the continuous capturing speed of the lens apparatus and the camera system. The operational sequence and each operation time period are mere examples, and may significantly change according to the light quantity and the focus state of the object.

Thus, the timing chart in the conventional camera system illustrated in FIG. 5 illustrates each operation of the lens apparatus and each operation of the camera body in time sequence.

A description will now be given of the characteristic and structure of the diaphragm unit 204 mounted in the interchangeable lens (lens apparatus) 200.

Figure 3:
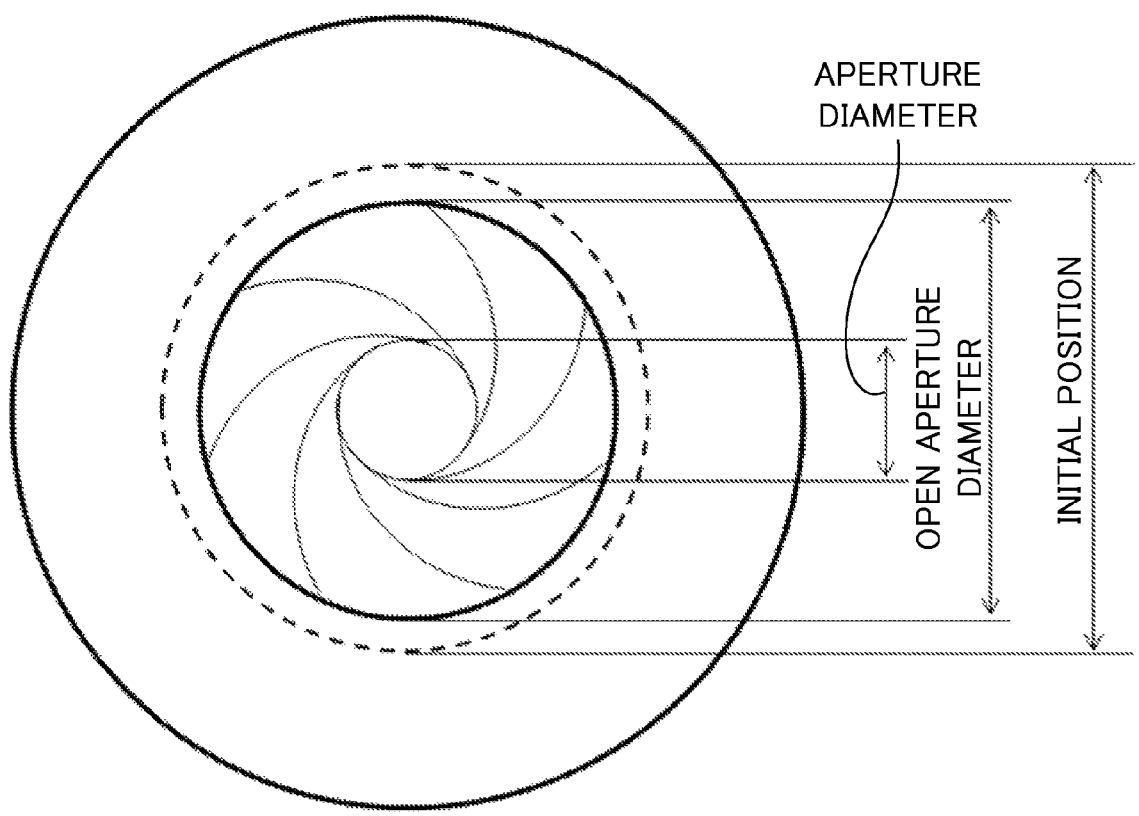
FIG. 3 illustrates an aperture diameter, an open aperture diameter, and an initial position of a diaphragm unit according to the embodiment of the present invention.

FIG. 3 illustrates an aperture diameter, an open aperture diameter, and an initial position of the diaphragm unit 204 according to this embodiment of the present invention.

The aperture diameter is formed by rotating the stepping motor in the aperture driver 205 and by consequently rotating the plurality of aperture blades in the aperture narrowing direction, and the light quantity that passes the diaphragm unit 204 is determined by the movable aperture blades. In other words, the aperture diameter is a diameter of an aperture formed by the plurality of aperture blades. The open aperture diameter is a diameter that is available by rotating the stepping motor in the aperture driver 205 and by moving the plurality of aperture blades in the aperture opening direction. The open aperture diameter determines the light quantity that passes the diaphragm unit 204 and is a fixed aperture diameter formed by the component in the diaphragm unit 204. The initial position is a position at which the plurality of blades are located outside of the position of the open aperture diameter ("open aperture position") before they are moved in the open aperture direction by the stepping motor in the aperture driver 205. Herein, the initial position is located outside the open aperture position in the radial direction so that the aperture blades do not project into the open aperture even when the diaphragm unit 204 has the most manufacturing and assembly errors among its components. The diaphragm unit 204 having such a structure enables the open aperture diameter to be set by the fixed aperture diameter in the photometry, and the photometric precision can be improved after the aperture has been opened.

Figure 4:
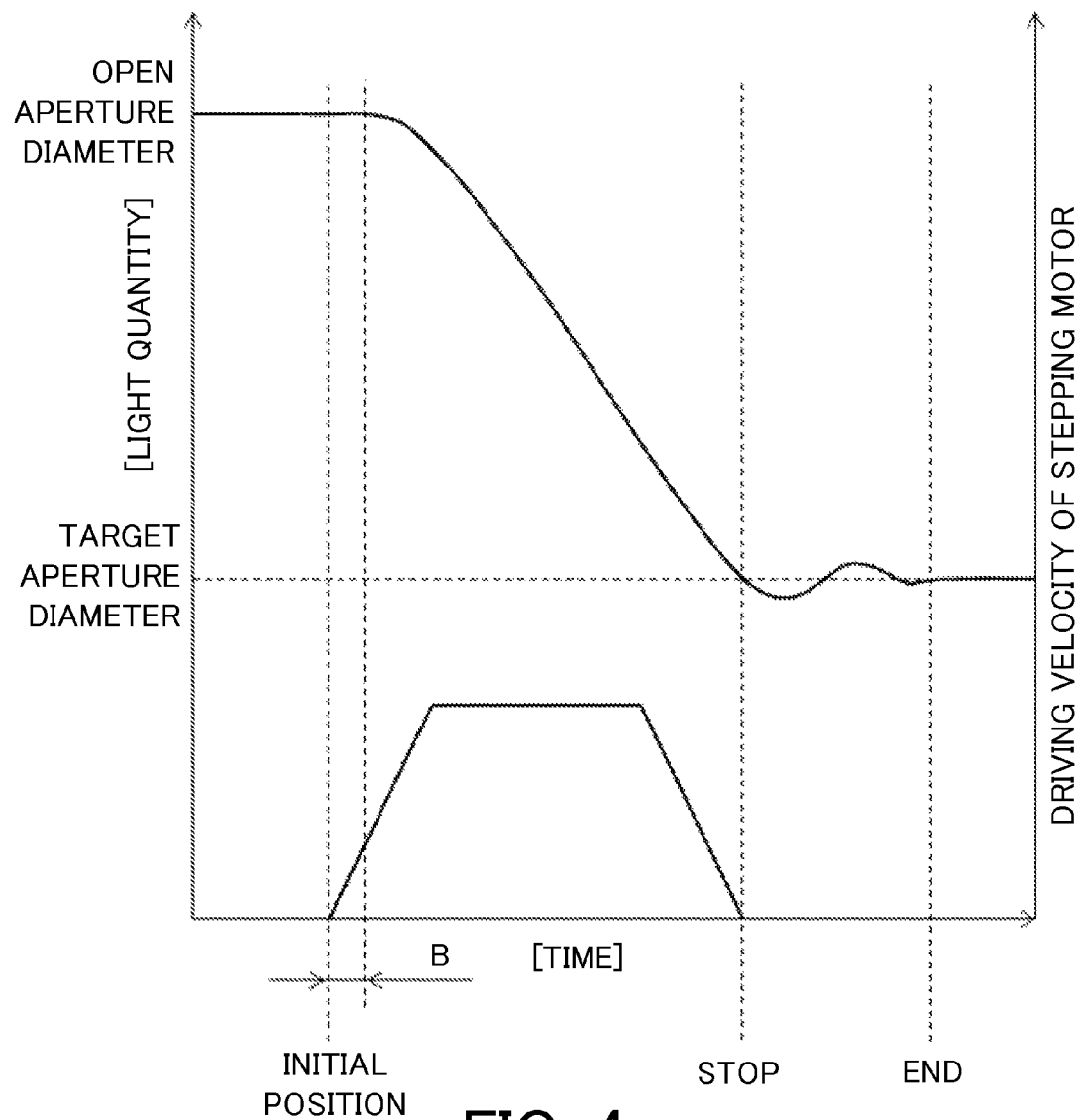
FIG. 4 is a graph illustrating a relationship among a driving velocity of the diaphragm unit, a light quantity, and time according to the embodiment of the present invention.

FIG. 4 is a graph for explaining an illustrative control method when the stepping motor is used as the aperture driver 205 for the diaphragm unit 204 according to one embodiment of the present invention. An abscissa axis denotes time.

The left (first) ordinate axis denotes a light quantity that passes the diaphragm unit 204, and the right (second) ordinate axis denotes a driving velocity sent from the lens CPU 206 to the aperture driver 205 as the stepping motor. A graph at the bottom in FIG. 4 represents a graph of driving velocity information (acceleration, constant velocity, and deceleration) sent from the lens CPU 206 to the stepping motor as the aperture driver 205. A graph at the top in FIG. 4 illustrates a variation of the light quantity that has passes the diaphragm unit 204 when the diaphragm unit 204 narrows the aperture from the initial position to a target aperture diameter based on the driving velocity information sent from the lens CPU 206 to the aperture driver 205 as the stepping motor. As understood from these graphs, the initial position of the diaphragm unit 204 is set outside the open aperture position in the radial direction, and thus the light quantity corresponding to a predetermined area from the initial position does not change in a B period. Then, the aperture blades move to the inside of the open aperture position, and the light quantity fluctuates until the time reaches the "end" position on the abscissa axis after the "stop" position on the abscissa axis, which provides the target aperture diameter. This phenomenon happens because the motion energy remains in the aperture narrowing components in the diaphragm unit 204, although a transmission of the driving velocity information from the lens CPU 206 to the stepping motor as the diaphragm unit 205 has already ended. Hence, the stabilization period (from the "stop" time to the "end" time) is secured in the control so as to stabilize the light quantity of the diaphragm unit 204 after the transmission of the driving velocity information sent from the lens CPU 206 to the aperture driver 205 as the stepping motor ends. The exposure operation of the camera body 100 follows after this stabilization period ends.

Figure 1:
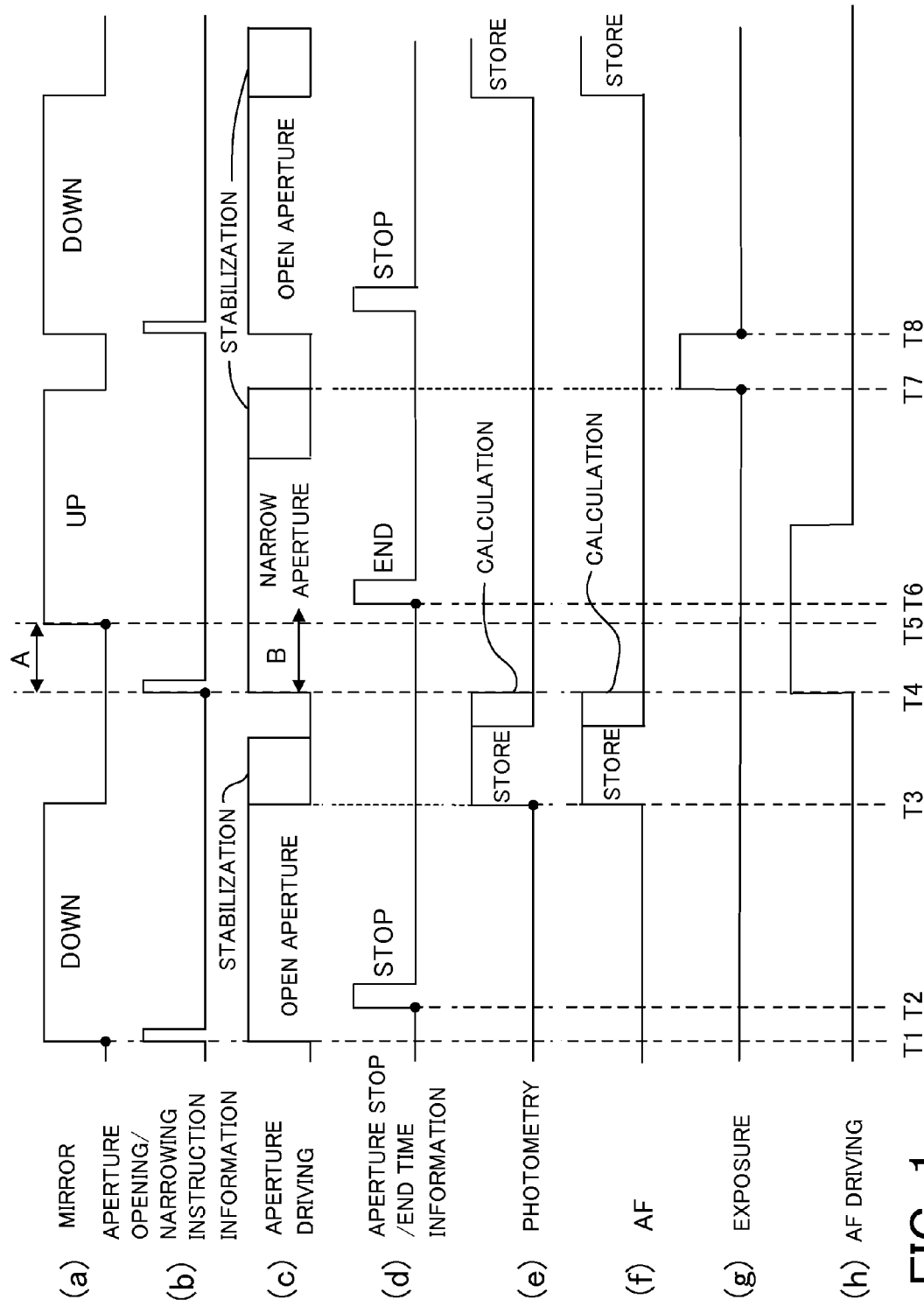
FIG. 1 is a timing chart of a camera system according to one embodiment of the present invention.

FIG. 1 is a timing chart in the camera system according to this embodiment.

Herein, (a) to (h) illustrate operations of the lens apparatus or the camera body, and each of T1 to T8 represents time in the time base for each operation. A description will be given of the association between the lens apparatus and the camera body, with reference to FIG. 2 that is a block diagram of the camera system according to this embodiment.

At the time T1, the camera CPU 106 in the camera body 100 sends moving down information of the mirror 101 to the mirror controller 105 so as to (a) move down the mirror 101. At the same time, the camera CPU 106 in the camera body 100 sends (b) aperture opening instruction information (aperture driving instruction information) or an aperture stop/end time request to the lens CPU 206 via the camera communication controller 107 and the lens communication controller 207 in the lens apparatus 200. When the interchangeable lens 200 receives the aperture opening instruction information from the camera body 100, the lens CPU 206 sends the driving velocity information of the stepping motor to the aperture driver 205 so as to drive the diaphragm unit 204 in the aperture opening direction. Thereby, the diaphragm unit 204 starts (c) opening the aperture.

At the time T2, the lens CPU 206 in the interchangeable lens 200 obtains the (d) aperture stop time information necessary for the diaphragm unit 204 to reach the position of the aperture opening instruction information, based on the aperture opening instruction information or the aperture stop/end time request of the diaphragm unit 204 sent from the camera body 100. The lens CPU 206 sends the calculated (d) aperture stop time information to the camera CPU 106. The time T2 at which the (d) aperture stop time information is sent is located between the time T1 and the time T3, as illustrated in FIG. 1, while the aperture driver 205 drives the diaphragm unit 204. In other words, the lens controller sends to the camera body 100 the time information (or (d) the aperture stop time information) necessary to drive the diaphragm unit 204 corresponding to the (b) aperture opening instruction information or the aperture stop/end time request. The camera CPU 106 in the camera body 100 stores the (d) aperture stop time information received from the lens CPU 206, in the storage unit in the camera CPU 106. In this way, the camera CPU 106 has the storage unit configured to store time information on driving of the diaphragm unit 204 received from the interchangeable lens 200. At the time T2, the aperture driving instruction information sent from the camera body 100 contains instruction information used to adjust the aperture diameter formed by the aperture blades of the diaphragm unit 204 so that it can be the aperture diameter larger than the open aperture diameter as the fixed aperture diameter formed by the unillustrated in the component. In this case, the (d) aperture stop time information sent from the interchangeable lens 200 contains time information (from the time T1 to the time T3) which starts when the aperture driver 205 starts driving the diaphragm unit 204 and ends when the diaphragm unit 204 stops driving the diaphragm unit 204. A time period from the time T1 to the time T3 is a time period that starts when the camera CPU 106 sends the (b) aperture opening instruction information and ends when the lens CPU 206 finishes sending the driving velocity information of the stepping motor as the aperture driver 205.

The camera body 100 can receive (d) the aperture stop time information from the lens CPU 206 in the period from the time T1 to the time T3, and store the time base necessary for the diaphragm unit 204 to reach the position corresponding to the aperture opening instruction information by the time T3. The camera body 100 detects the light quantity of or around the object using the photometric detector 114 based on the (d) aperture stop time information received from the interchangeable lens 200, and starts the (e) photometric storage and calculating operation (photometric operation) used to calculate the proper shutter speed and aperture amount. At the same time, the camera body 100 makes the focus detector 112 start the (f) AF storage and calculating operation (focus detection) used to detect the focus state of the object. In other words, the camera controller starts an operation of the camera body 100 based on the (d) aperture stop time information received from the interchangeable lens 200 during a period that starts when the aperture driver 205 starts driving the diaphragm unit 204 and ends when the diaphragm unit 204 stops driving the diaphragm unit 204. As illustrated in FIG. 1, the camera controller starts the operation of the camera body 100 (photometric operation and focus detecting operation) in the stabilization period that starts at the time T3 at which the aperture driver 205 stops driving, and that is necessary for the light quantity passing through the diaphragm unit 204 to be stable. This embodiment starts the photometric operation and the focus detecting operation just after the time T3 at which the aperture driver 205 stops driving (or the transmission of the driving velocity information ends from the lens CPU 206 to the stepping motor as the aperture driver 205). A description will now be given of the reason why the camera body 100 can perform (e) the photometric operation and (f) the focus detecting operation at the time T3. The diaphragm unit 204 in the lens apparatus 200 according to this embodiment has the structure described with reference to FIGS. 3 and 4, and the aperture blades can move to the initial position illustrated in FIG. 3 when the diaphragm unit 204 is moved to the aperture opening direction. Only when the aperture blades are moved in the aperture opening direction, the aperture of the diaphragm unit 204 satisfies the open aperture diameter when it reaches a target aperture diameter illustrated in FIG. 4 (which is the initial position outside of the open aperture diameter), and does not affect the precisions of the photometric operation and focus detecting operation. This embodiment can start (e) the photometric operation and (f) focus detecting operation without waiting for the stabilization period of the diaphragm unit 204 in the timing chart of the camera system illustrated in FIG. 1, and can save the stabilization period. This embodiment can also save the transmission time of the (d) aperture stop time information from the interchangeable lens 200 to the camera body 100 in the operation of the aperture driver 205 (in the time base from the time T1 to the time T3).

The operations at the time T2 and at the time T3 can be realized without relying on the shutter speed in the camera body 100, and thus the time can be saved in the aperture opening direction of the diaphragm unit.

At the time T4, the (e) photometric calculation ends and the camera body 100 calculates the aperture narrowing instruction information of the diaphragm unit 204. The exposure controller 109 sends the calculated (b) aperture narrowing instruction information or the aperture stop/end time request to the lens CPU 206 via the camera communication controller 107 and the lens communication controller 207. At the same time, the (f) AF calculating operation ends and the camera body 100 calculates the AF driving instruction information. Then, the camera CPU 106 sends the calculated AF driving instruction information to the lens CPU 206 via the camera communication controller 107 and the lens communication controller 207. In other words, the camera controller sends (b) the aperture narrowing instruction information and the AF driving instruction information to the interchangeable lens 200 at the time T4, after the photometric calculating operating and the AF calculating operation end. In the interchangeable lens 200, when receiving the aperture narrowing instruction information from the exposure controller 109, the lens CPU 206 sends the driving velocity information to the stepping motor as the aperture driver 205 so as to move the diaphragm unit 204 in the aperture narrowing direction. Thereby, (c) the diaphragm unit 204 starts narrowing the aperture. In other words, after sending the (d) aperture stop time information to the camera body 100 at the time T2, the lens controller receives the (b) aperture narrowing instruction information from the camera body 100 at the time T4 and controls the aperture driver 205 based on the aperture narrowing instruction information. Thereby, (c) the aperture narrowing operation of the diaphragm unit 204 is started. In the camera system according to this embodiment, the mirror 101 is moved down at the time T4. When the mirror 101 is moved down, the object light passes the image pickup optical system of the interchangeable lens 200, is reflected on the mirror 101, and is guided to the pentaprism 103. The object light reflected on the pentaprism 103 passes the viewfinder optical system 104, and is led to the user's eye. Thereby, the user can visually confirm the object image. In addition, when the diaphragm unit 204 starts narrowing the aperture, as explained with reference to FIGS. 3 and 4, the light quantity passing through the diaphragm unit 204 does not change because the aperture blades do not project into the inside of the open aperture position during the B period. Therefore, while this embodiment starts narrowing the aperture of the diaphragm unit 204 when the mirror 101 is moved down, the user does not feel discomfort in the visible confirmation.

At the time T5, the camera CPU 106 in the camera body 100 sends the moving-up information of the mirror 101 to the mirror controller 105, and (a) moves up the mirror 101. In other words, the camera controller changes the state of the mirror 101 from the insertion state into the optical path to the retreat state from the optical path at the time T5. The time base when the mirror 101 changes from the down state to the up state is previously determined by the camera CPU 106 based on the visible confirmation of the user. It may be performed before the diaphragm unit 204 starts narrowing the aperture and the aperture blades project into the inside of the open aperture position.

This embodiment sets an A period that starts when the exposure controller 109 in the camera body 100 sends the aperture narrowing instruction information of the diaphragm unit 204 to the lens CPU 206, and ends when the mirror 101 starts moving up. In other words, this embodiment sets the A period (first time period) from the time T4 when the camera body 100 sends the aperture narrowing instruction information to the interchangeable lens 200 to the time T5 when the mirror 101 that has been inserted into the optical path starts retreating. The B period is a time period necessary for the aperture blades located at the initial position to reach the open aperture position. In other words, the B period (second time period) is a time period necessary for the aperture diameter formed by the aperture blades of the diaphragm unit 204 driven according to the aperture narrowing instruction information to reach the open aperture position from a position having a diameter larger than the open aperture diameter as the fixed aperture diameter provided by the unillustrated components.

At this time, a relationship A≤B may be established between the A period and the B period. In other words, the A period (first time period) may be equal to or smaller than the B period (second time period). Thereby, an overlap time period between the A period and the B period can be saved.

The operations at the time T4 and at the time T5 can be realized without relying on the shutter speed in the camera body 100, and thus the time can be saved in the aperture opening direction of the diaphragm unit.

In shortening the B period, A>B may be presumed. This may be realized as long as it is permissible to the visible confirmation of the user. Thereby, the B period itself may be shortened.

At the time T6, the lens CPU 206 calculates, based on the aperture narrowing instruction information or the aperture stop/end time request of the diaphragm unit 204 sent from the camera body 100, the (d) aperture end time information by which the diaphragm unit 204 reaches the position corresponding to the aperture narrowing instruction information and the stabilization period ends. Then, the lens CPU 206 sends the calculated (d) aperture end time information to the camera CPU 106. The camera CPU 106 in the camera body 100 stores the (d) aperture end time information received from the lens CPU 206 in the storage unit in the camera CPU 106. At the time T4, the aperture driving instruction information sent from the camera body 100 contains driving instruction information used to make the aperture diameter formed by the aperture blades of the diaphragm unit 204 smaller than the open aperture diameter as the fixed aperture diameter provided to the unillustrated components. In this case, the (d) aperture end time information sent from the interchangeable lens 200 contains time information (from the time T4 to the time T7) which is made by adding a predetermined time period to the time period that starts when the aperture driver 205 starts driving the diaphragm unit 204 and ends when the diaphragm unit 204 stops driving the diaphragm unit 204. The "predetermined time period," as used herein, means a stabilization period (corresponding to the time period from the "stop" to the "end" in FIG. 4) used for the light quantity passing through the diaphragm unit 204 to be stable after the aperture driver 205 stops driving. The time period from the time T4 to the time T7 is a time period that starts when the exposure controller 109 sends the (b) aperture narrowing instruction information or the aperture stop/end time request and ends when a transmission from the lens CPU 206 of the driving velocity information of the stepping motor as the aperture driver 205 ends and the stabilization time period ends.

The camera body 100 receives the (d) aperture end time information from the lens CPU 206 in the time period from the time T4 to the time T7, and stores at the time T7 the time base in which the diaphragm unit 204 reaches the position corresponding to the aperture narrowing instruction information and the stabilization period ends. Then, the camera body 100 starts the (g) exposure operation so as to form an object image on the image pickup unit 102 using the object light that has passed the image pickup optical system of the interchangeable lens 200, based on the (d) narrowing end time information received from the interchangeable lens 200. Thereby, as illustrated in FIG. 1 as the timing chart of the camera system, as soon as the stabilization period of the diaphragm unit 204 ends, the (g) exposure operation can be started. In other words, in the operation of the diaphragm unit 204 (in the time base from the time T4 to the time T7), this embodiment can save the transmission time of the (d) narrowing end time information itself sent from the interchangeable lens 200 to the camera body 100.

The operations at the time T6 and at the time T7 can be realized without relying on the shutter speed in the camera body 100, and thus the time can be saved in the aperture opening direction of the diaphragm unit.

At the time T8, when the (g) exposure operation of the camera body 100 ends. A total time period of the continuous capturing velocity is determined based on the time period from the time T1 to the time T8. Next to the time T8, the operation at the time T1 in the time base is repeated.

This configuration enables the (e) photometric operation and the (f) focus detecting operation to be started without waiting for the stabilization period in opening the aperture in the diaphragm unit 204, and the stabilization period can be saved. Moreover, the transmission time of (d) the aperture stop time information itself sent from the interchangeable lens 200 to the camera body 100 can be saved. In the aperture narrowing operation of the diaphragm unit 204 while the mirror 101 is being moved down, the user does not feel discomfort in the visible confirmation and an overlap time period between the A time period and the B time period can be saved. In addition, the transmission time of the (d) aperture end time information itself sent from the interchangeable lens 200 to the camera body 100 can be saved.

Due to the above time-saving effect, the time can be saved in the aperture opening/narrowing direction in the diaphragm unit without relying on the shutter speed of the camera body, and the present invention can provide a lens apparatus, an image pickup apparatus, and an image pickup system, which can make faster the continuous capturing velocity. In this operation, the operation and each time base are mere illustrative, and may be significantly variable depending particularly upon the light quantity and the focus state of the object.

The present invention can provide a lens apparatus, an image pickup apparatus, and an image pickup system, each of which is advantageous to the continuous capturing speed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-153831, filed on Jul. 29, 2014, which is hereby incorporated by reference herein in its entirety.

What is claimed is:

1. A lens apparatus attachable to an image pickup apparatus, the lens apparatus comprising:
   a diaphragm unit;
   a driver configured to drive the diaphragm unit; and
   a lens controller configured to communicate with the image pickup apparatus to which the lens apparatus is attached, and to control the driver,
   wherein the lens controller is configured to send, to the image pickup apparatus, time information necessary to drive the diaphragm unit, during a period that starts when the driver starts driving the diaphragm unit and ends when the driver firstly stops driving the diaphragm unit,
   wherein the lens controller is configured to send to the image pickup apparatus, information of a period that starts when the driver starts driving the diaphragm unit and ends when the driver firstly stops driving the diaphragm unit as the time information, in a case where the driver drives the diaphragm unit so that an aperture diameter formed by aperture blades in the diaphragm unit is larger than an open aperture diameter that is a fixed aperture diameter formed by a component in the diaphragm unit, and
   wherein the lens controller is configured to send to the image pickup apparatus, information of a sum of the period that starts when the driver starts driving the diaphragm unit and ends when the driver firstly stops driving the diaphragm unit, and a predetermined time period, as the time information, in a case where the driver drives the diaphragm unit so that the aperture diameter is smaller than the open aperture diameter.

2. The lens apparatus according to claim 1, wherein the predetermined time period is a stabilization period used for light quantity passing through the diaphragm unit to become stable after the driver stops driving.

3. The lens apparatus according to claim 1, wherein, after sending the time information to the image pickup apparatus, the lens controller is configured to receive an aperture driving instruction information from the image pickup apparatus and is configured to control the driver based on the received aperture driving instruction information.

4. An image pickup apparatus comprising a camera controller configured to communicate with a lens apparatus that is attached to the image pickup apparatus, the lens apparatus including a diaphragm unit and a driver configured to drive the diaphragm unit, and being attachable to the image pickup apparatus,
   wherein the camera controller is configured to start an operation of the image pickup apparatus based on time information received from the lens apparatus during a period that starts when the driver starts driving the diaphragm unit and ends when the driver firstly stops driving the diaphragm unit,
   wherein the time information is necessary to drive the diaphragm unit,
   wherein the camera controller is configured to receive from the lens apparatus, information of a period that starts when the driver starts driving the diaphragm unit and ends when the driver firstly stops driving the diaphragm unit as the time information, in a case where the driver drives the diaphragm unit so that an aperture diameter formed by aperture blades in the diaphragm unit is larger than an open aperture diameter that is a fixed aperture diameter formed by a component in the diaphragm unit, and
   wherein the camera controller is configured to receive from the lens apparatus, information of a sum of the period that starts when the driver starts driving the diaphragm unit and ends when the driver firstly stops driving the diaphragm unit, and a predetermined time period, as the time information, in a case where the driver drives the diaphragm unit so that the aperture diameter is smaller than the open aperture diameter.

5. The image pickup apparatus according to claim 4, further comprising a storage unit configured to store the time information received from the lens apparatus.

6. The image pickup apparatus according to claim 4, wherein the camera controller is configured to start the operation of the image pickup apparatus in the predetermined time period, in a case where the aperture diameter is larger than the open aperture diameter.

7. The image pickup apparatus according to claim 4, further comprising a photometric detector,
   wherein the camera controller is configured to start a photometric operation by controlling the photometric detector based on the time information.

8. The image pickup apparatus according to claim 4, further comprising a focus detector,
wherein the camera controller is configured to start a focus detecting operation by controlling the focus detector based on the time information.

9. The image pickup apparatus according to claim 4, further comprising a light-guiding unit configured to retreat from an optical path so as to guide light from an object to an image pickup unit, and to enter the optical path so as to guide the light from the object to an eye of a photographer,
wherein, after the operation of the image pickup apparatus ends, the camera controller is configured to send an aperture driving instruction to the lens apparatus to control the driver driving the diaphragm unit based on the sent aperture driving instruction information to retreat from the light path, the light-guiding unit that has entered the light path, and
wherein a first time period, which starts when the aperture driving instruction information is sent and ends when the light-guiding unit starts retreating, is equal to or smaller than a second time period necessary for the aperture diameter to change from an aperture diameter larger than the open aperture diameter to the open aperture diameter.

10. The image pickup apparatus according to claim 4, further comprising an image pickup unit,
wherein the camera controller is configured to start an exposure operation by controlling the image pickup unit based on the time information.

11. The image pickup apparatus according to claim 4, wherein the predetermined time period is a stabilization time necessary for the light quantity passing through the diaphragm unit to become stable after the driver stops driving.

12. An image pickup system comprising:
a lens apparatus; and
an image pickup apparatus, to which the lens apparatus is attachable,
wherein the lens apparatus includes:
a diaphragm unit;
a driver configured to drive the diaphragm unit; and
a lens controller configured to communicate with the image pickup apparatus to which the lens apparatus is attached, and to control the driver,
wherein the image pickup apparatus includes a camera controller configured to communicate with the lens apparatus that is attached to the image pickup apparatus,
wherein the lens controller is configured to send to the camera controller, time information necessary to drive the diaphragm unit, during a period that starts when the driver starts driving the diaphragm unit and ends when the driver firstly stops driving the diaphragm unit,
wherein the camera controller is configured to start an operation of the image pickup apparatus based on the time information received from the lens controller during the period that starts when the driver starts driving the diaphragm unit and ends when the driver firstly stops driving the diaphragm unit,
wherein the lens controller is configured to send to the camera controller, information of a period that starts when the driver starts driving the diaphragm unit and ends when the driver firstly stops driving the diaphragm unit as the time information, in a case where the driver drives the diaphragm unit so that an aperture diameter formed by aperture blades in the diaphragm unit is larger than an open aperture diameter that is a fixed aperture diameter formed by a component in the diaphragm unit, and
wherein the lens controller is configured to send to the camera controller, information of a sum of the period that starts when the driver starts driving the diaphragm unit and ends when the driver firstly stops driving the diaphragm unit, and a predetermined time period, as the time information, in a case where the driver drives the diaphragm unit so that the aperture diameter is smaller than the open aperture diameter.

13. The lens apparatus according to claim 1, wherein, after sending the time information to the image pickup apparatus, the lens controller is configured to receive an aperture stop time request from the image pickup apparatus and control the driver based on the received aperture stop time request.

14. The image pickup apparatus according to claim 4, further comprising a light-guiding unit configured to retreat from an optical path so as to guide light from an object to an image pickup unit, and to enter the optical path so as to guide the light from the object to an eye of a photographer,
wherein, after the operation of the image pickup apparatus ends, the camera controller is configured to send an aperture stop time request to the lens apparatus to control the driver driving the diaphragm unit based on the sent aperture stop time request to retreat from the light path, the light-guiding unit that has entered the light path, and
wherein a first time period, which starts when the aperture stop time request is sent and ends when the light-guiding unit starts retreating, is equal to or smaller than a second time period necessary for the aperture diameter to change from an aperture diameter larger than the open aperture diameter to the open aperture diameter.

15. The image pickup apparatus according to claim 6, wherein the predetermined time period is a stabilization period used for light quantity passing through the diaphragm unit to become stable after the driver stops driving.

* * * * *